US010239760B2

United States Patent
Ueno et al.

(10) Patent No.: US 10,239,760 B2
(45) Date of Patent: Mar. 26, 2019

(54) METHOD FOR PRODUCING ZEOLITE

(71) Applicant: Panasonic Intellectual Property Management Co., Ltd., Osaka (JP)

(72) Inventors: Iwao Ueno, Kyoto (JP); Naoki Kosugi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/466,185

(22) Filed: Mar. 22, 2017

(65) Prior Publication Data

US 2017/0190588 A1 Jul. 6, 2017

Related U.S. Application Data

(63) Continuation of application No. PCT/JP2015/004785, filed on Sep. 18, 2015.

(30) Foreign Application Priority Data

Sep. 26, 2014 (JP) .................................. 2014-196561
Feb. 24, 2015 (JP) .................................. 2015-034014

(51) Int. Cl.
*B01J 20/30* (2006.01)
*C01B 39/02* (2006.01)
(Continued)

(52) U.S. Cl.
CPC .............. *C01B 39/14* (2013.01); *B01J 20/18* (2013.01); *B01J 20/30* (2013.01); *B01J 20/3021* (2013.01); *C01B 39/02* (2013.01); *C01P 2006/90* (2013.01)

(58) Field of Classification Search
CPC ..... C01P 2006/90; C01B 39/02; C01B 39/14; B01J 29/18; B01J 29/30; B01J 29/3021
See application file for complete search history.

(56) References Cited

U.S. PATENT DOCUMENTS

2017/0190588 A1* 7/2017 Ueno ....................... B01J 20/18

FOREIGN PATENT DOCUMENTS

JP 2005-289735 10/2005
JP 2006-240920 9/2006
(Continued)

OTHER PUBLICATIONS

International Search Report issued in International Application No. PCT/JP2015/004785 dated Nov. 2, 2015.
(Continued)

*Primary Examiner* — David M Brunsman
(74) *Attorney, Agent, or Firm* — Wenderoth, Lind & Ponack, L.L.P.

(57) ABSTRACT

There is provided a method for producing a zeolite more excellent in moisture absorption characteristics. The method includes physically pulverizing a zeolite that has a gradient of a Na/Si value from a surface of the zeolite in a depth direction, that has a proportion of the Na/Si value at a depth of 10 nm from the surface to the Na/Si value at the surface of 90% or more, and that has a proportion of the Na/Si value at a depth of 30 nm from the surface to the Na/Si value at the surface of 70% or more, the Na/Si value representing a composition ratio between Na and Si, and crystallizing the physically pulverized zeolite.

4 Claims, 17 Drawing Sheets

(51) Int. Cl.
*C01B 39/14* (2006.01)
*B01J 20/18* (2006.01)

(56) References Cited

FOREIGN PATENT DOCUMENTS

| | | |
|---|---|---|
| JP | 2011-246292 | 12/2011 |
| JP | 2013-28507 | 2/2013 |
| JP | 2013-173624 | 9/2013 |

OTHER PUBLICATIONS

T. Wakihara et al., Bead-Milling and Postmilling Recrystallization: An Organic Template-free Methodology for the Production of Nano-zeolites, Crystal Growth & Design, 2011, 11, 955-958., whole document.

T. Wakihara et al., Top-down Tuning of Nanosized Zeolites by Bead-milling and Recrystallization, Journal of the Japan Petroleum Institute, 2013, 56, 206-213., abstract, 2. Miniaturization of Zeolites by Bead-milling, 4, Recrystallization of Amorphized Zeolite A.

* cited by examiner

METHOD FOR PRODUCING ZEOLITE

This application is a continuation of PCT/JP2015/004785, filed Sep. 18, 2015.

BACKGROUND

1. Technical Field

The present disclosure relates to a method for producing a fine zeolite having a nano particle size.

2. Description of the Related Art

Unexamined Japanese Patent Publication No. 2011-246292 discloses a method for producing a fine zeolite (nano zeolite) by dispersing fine zeolite particles obtained by pulverizing a zeolite in an aluminosilicate solution having a specific composition to recrystallize the fine zeolite particles.

SUMMARY

The present disclosure provides a method for producing a fine zeolite that is more excellent in moisture absorption characteristics and has a nano particle size. The method for producing a nano zeolite of the present disclosure includes physically pulverizing a zeolite that has a gradient of a Na/Si value from a surface of the zeolite in a depth direction, that has a proportion of the Na/Si value at a depth of 10 nm from the surface to the Na/Si value at the surface of 90% or more, and that has a proportion of the Na/Si value at a depth of 30 nm from the surface to the Na/Si value at the surface of 70% or more, the Na/Si value representing a composition ratio between Na and Si, and crystallizing the physically pulverized zeolite.

According to the production method of the present disclosure, a nano zeolite more excellent in moisture absorption characteristics can be produced.

DETAILED DESCRIPTION

Hereinafter, an exemplary embodiment is described in detail with appropriate reference to drawings. Detailed description more than necessary, however, is sometimes omitted. For example, description is sometimes omitted for a detail of a well-known matter and for repetition of a substantially identical configuration. This is to avoid the following description from being unnecessarily redundant, for easy understanding by those skilled in the art.

The inventors of the present disclosure provide accompanying drawings and the following description to help those skilled in the art sufficiently understand the present disclosure, and the inventors of the present disclosure do not intend to limit subject matters described in claims by these drawings and description.

First Exemplary Embodiment

Figure 1:
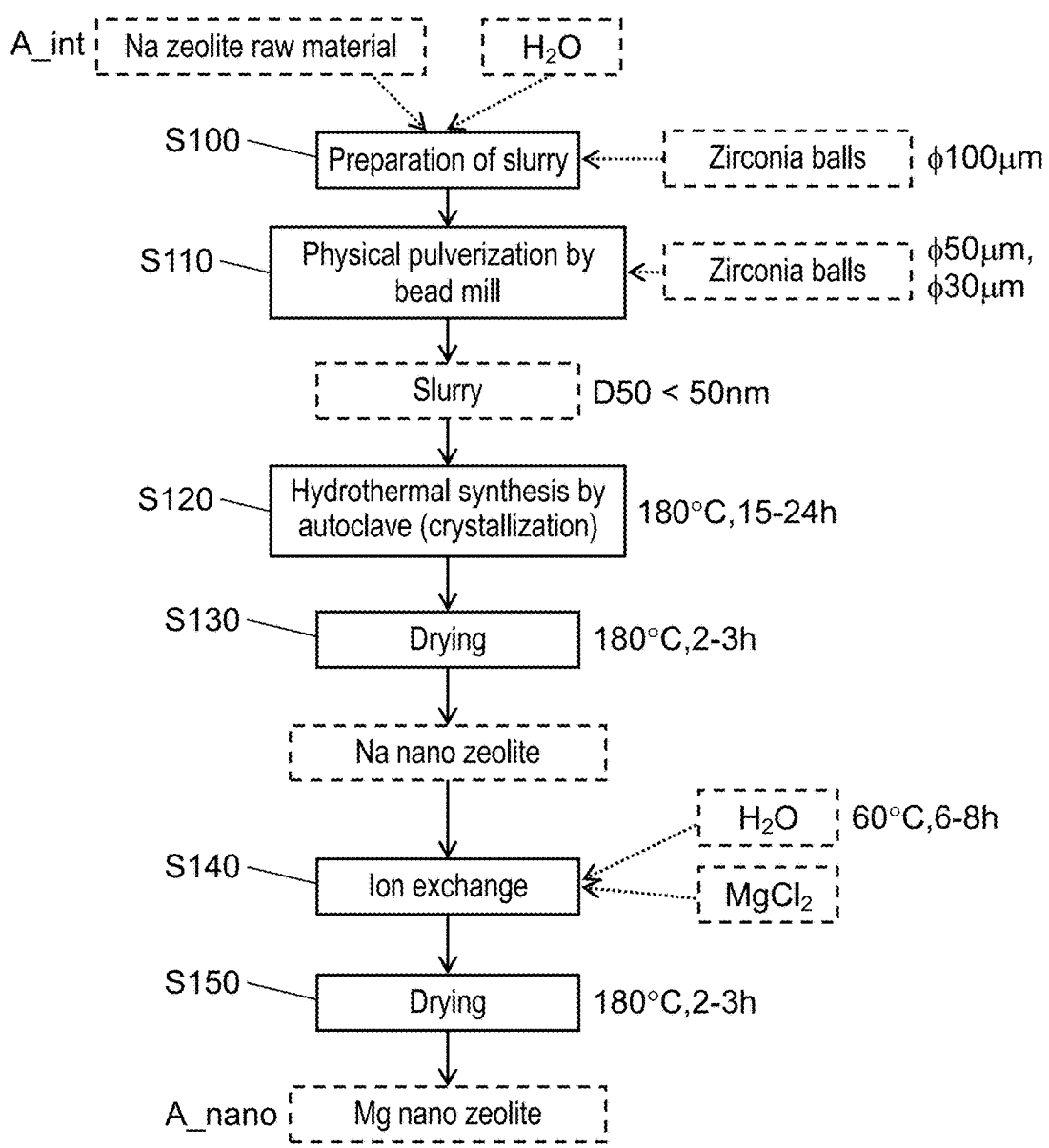
FIG. 1 is a flow chart that illustrates a method for producing a nano zeolite according to a first exemplary embodiment.

A first exemplary embodiment is an example of a method for producing a nano zeolite of the present disclosure. FIG. 1 is a flow chart that illustrates a method for producing a nano zeolite according to the first exemplary embodiment. The method for producing a nano zeolite is sequentially described with reference to the flow chart illustrated in FIG. 1. The nano zeolite refers to a zeolite having a nano particle size, and the zeolite having a nano particle size is defined as a nano zeolite in the following exemplary embodiment.

[1. Preparation of Slurry of Raw Material Zeolite]

First, a sodium zeolite (hereinafter, referred to as a "Na zeolite") as a main raw material is mixed with $H_2O$ to prepare a slurry (S100). Used as an initially charged material, the Na zeolite is an LTA zeolite (A-type zeolite: $|Na^+{}_{12}(H_2O)_{27}|_8[Al_{12}Si_{12}O_{48}]_8$). The Na zeolite satisfies predetermined conditions of a relationship between depth from a surface and a Na/Si value as a composition ratio.

Figure 2:
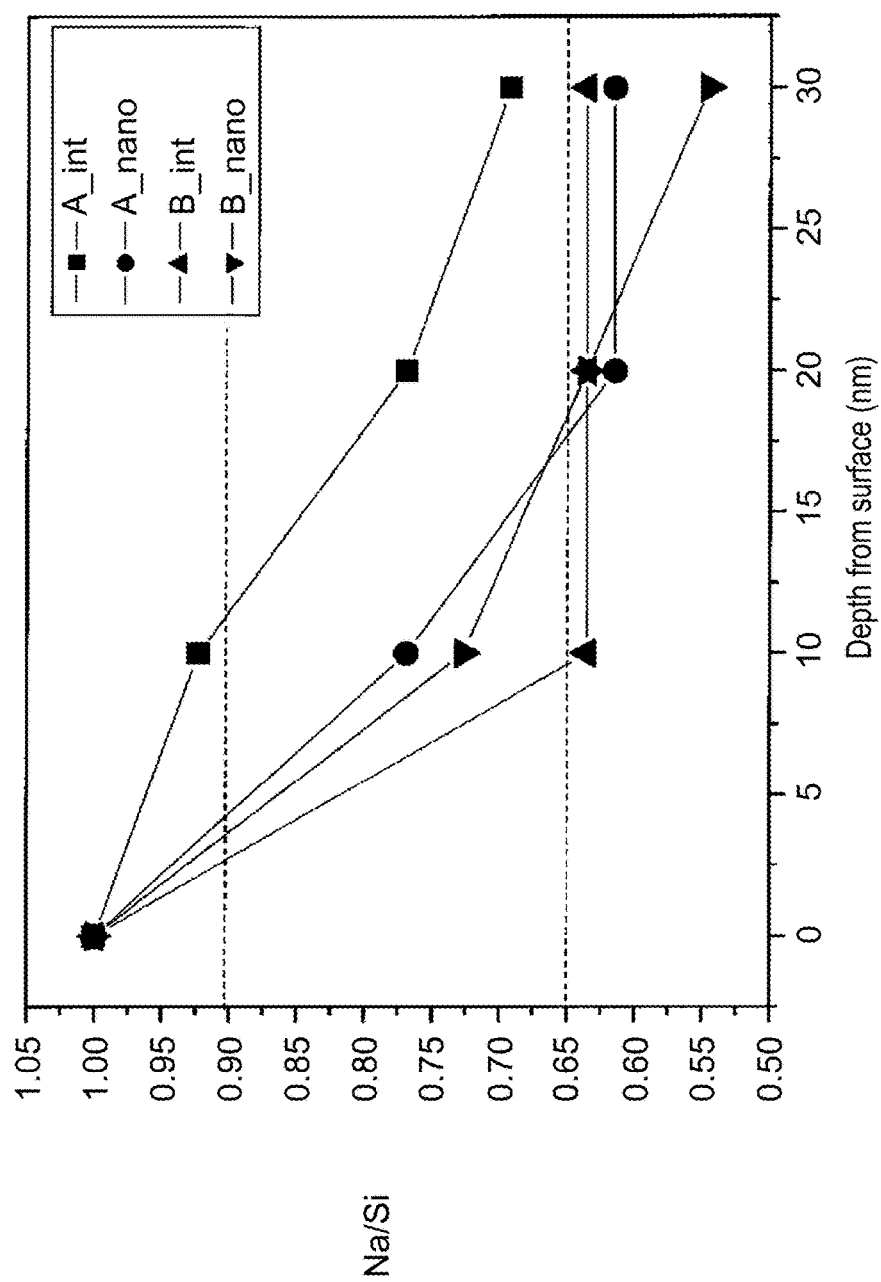
FIG. 2 is a graph that illustrates a relationship between depth from a surface and a Na/Si value of zeolites and nano zeolites.

FIG. 2 is a graph that illustrates the relationship between the depth from the surface and the Na/Si value of zeolites and nano zeolites. In FIG. 2, a vertical axis represents the Na/Si value and a horizontal axis represents the depth from the surface of the zeolites and the nano zeolites (the depth at the surface is defined as 0 nm, and the Na/Si value at the surface is defined as 1.00).

In FIG. 2, (A_int) represents a plot of the Na/Si value vs. the depth from the surface of a zeolite A, and (B_int) represents a plot of the Na/Si value vs. the depth from the surface of a zeolite B. The zeolite A and the zeolite B both have an LTA structure but are different in the relationship between the depth from the surface and the Na/Si value. That is, the zeolite A has a proportion of the Na/Si value at a depth of 10 nm from the surface to the Na/Si value at the surface of 90%, and a proportion of the Na/Si value at a depth of 30 nm from the surface to the Na/Si value at the surface of 70%. On the other hand, the zeolite B for comparison has a proportion of the Na/Si value at a depth of 10 nm from the surface to the Na/Si value at the surface of 65%, and also has a proportion of the Na/Si value at a depth of 30 nm from the surface to the Na/Si value at the surface of 65%.

In FIG. 2, (A_nano) represents a plot of the Na/Si value vs. the depth from the surface of a nano zeolite A prepared from the zeolite A, and (B_nano) represents a plot of the Na/Si value vs. the depth from the surface of a nano zeolite B prepared from the zeolite B.

As illustrated in FIG. 2, the nano zeolite B is understood to have a steep gradient of the Na/Si value (the Na/Si value is largely decreased) from the surface in the depth direction as compared with the nano zeolite A. The inventors of the present disclosure have discovered that the gradient of the Na/Si value from the surface in the depth direction affects moisture absorption characteristics of a nano zeolite, and found that a nano zeolite having excellent moisture absorption characteristics can be prepared from a zeolite having such a relationship between the depth from the surface and the Na/Si value as in, for example, the zeolite A.

In the first exemplary embodiment, the Na zeolite, or the zeolite A is used as an initially charged material. As described above, with use of the zeolite A, a nano zeolite can be prepared that has excellent moisture absorption characteristics.

As illustrated in FIG. 1, particles of the zeolite A (initial particle size 5 μm, 100 g) are mixed with $H_2O$ (100 g) to prepare a slurry. Then, zirconia ($ZrO_2$) balls (particle size 100 μm, 400 g) are charged into the slurry. The particle size of the Na zeolite as an initially charged material is not particularly limited, and a zeolite having a particle size ranging, for example, from about 0.1 μm to about 10 μm can be used.

[2. Pulverization by Bead Mill]

Subsequently, the slurry prepared in S100 is charged into a bead mill to physically pulverize the zeolite A (S110).

Figure 3:
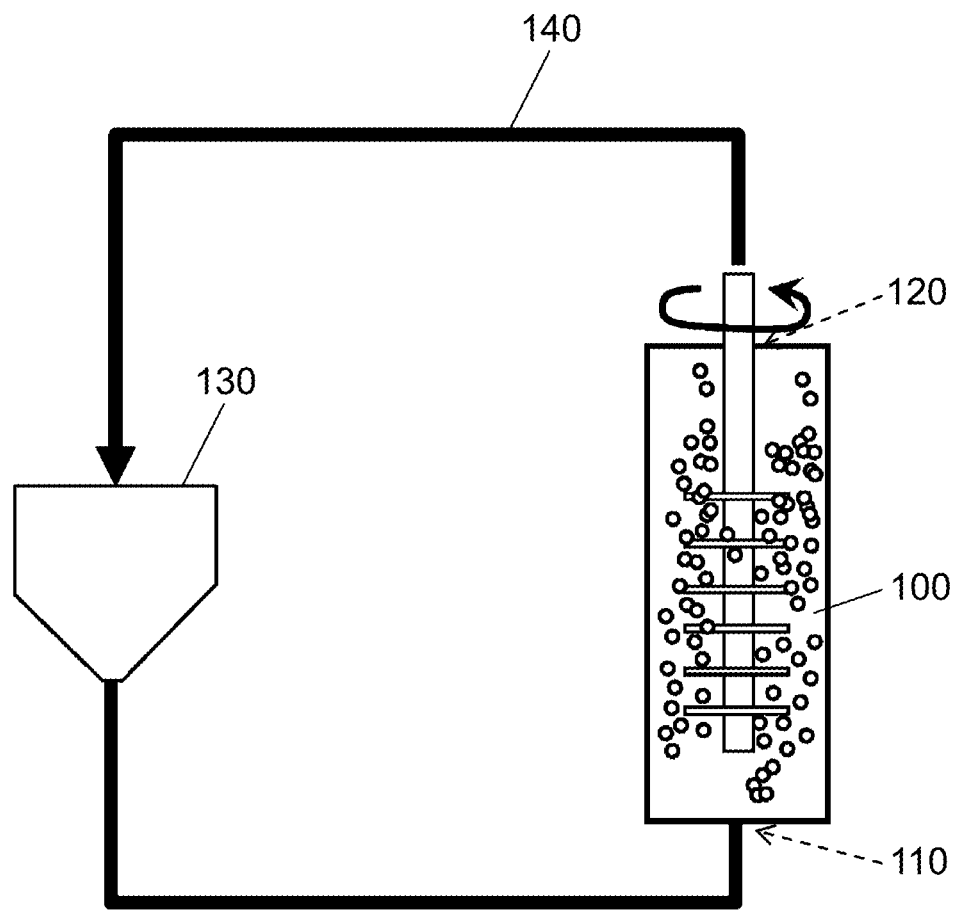
FIG. 3 is a schematic view for illustrating a step of physically pulverizing a zeolite by a bead mill.

FIG. 3 is a schematic view for illustrating a step of physically pulverizing a zeolite by a bead mill. As illustrated in FIG. 3, the physical pulverization by bead mill 100 is performed with use of slurry tank 130 and pipe 140. Bead mill 100 is, in the bead mill, provided with a rotary blade capable of physically pulverizing a charged material. The rotary blade can rotate at high speed to physically pulverize a charged material into nanoscale particles. Bead mill 100 also includes slurry inlet 110 and slurry outlet 120. Slurry inlet 110 and slurry outlet 120 are each connected to pipe 140. Hereinafter, the physical pulverization step by bead mill 100 is specifically described.

First, bead mill 100 is driven to perform a pulverization operation for about 3 hours so that the zeolite A has an average particle size of 120 nm. At this time, a flow rate of the slurry is 10 kg/h and a viscosity of the slurry is 10 mPa/s.

Bead mill 100 is connected to slurry tank 130. When $H_2O$ is charged into slurry tank 130, the slurry circulates between bead mill 100 and slurry tank 130 via pipe 140.

At a point when the pulverization operation has been performed for 2 hours, pipe 140 connected to slurry tank 130 is once evacuated from slurry tank 130 to another storage container. During the evacuation, bead mill 100 is kept driven, so that an amount of the slurry in slurry tank 130 decreases. At a point when slurry tank 130 has an amount of the slurry of zero, 100 g of $H_2O$ is additionally charged into slurry tank 130. Then, at a point when slurry tank 130 has no $H_2O$, the driving of bead mill 100 is stopped. Thus, an inside of bead mill 100 is washed with $H_2O$.

At this time, the zirconia balls (particle size 100 μm), that have been used previously and that are accumulated on a bottom part of bead mill 100, are taken out. After the inside of bead mill 100 is once washed with water, other new zirconia balls (particle size 50 μm, 400 g) are charged from a ball inlet (not shown) of bead mill 100. Then, pipe 140 that has been evacuated is reconnected to slurry tank 130, the slurry that has been evacuated to the storage container previously is recharged into slurry tank 130, and bead mill 100 is driven again simultaneously with the recharge. This state is kept for about 1 hour to perform a pulverization operation until the average particle size of the zeolite A becomes 70 nm. At this time, the flow rate of the slurry is 10 kg/h and the viscosity of the slurry is 6 mPa/s.

Then, the zirconia balls (particle size 50 μm) that have been used previously are taken out from bead mill 100, and other new zirconia balls (particle size 30 μm, 450 g) are charged instead. Further, 100 g of $H_2O$ is added, and a pulverization operation is performed for about 1 hour until the average particle size of the zeolite A becomes less than 50 nm. At this time, the flow rate of the slurry is 10 kg/h and the viscosity of the slurry is 4 mPa/s. The average particle size of the pulverized Na zeolite is not particularly limited, however, the average particle size favorably ranges, for example, from about 30 nm to about 100 nm.

Then, 100 g of $H_2O$ is added, and all the slurry is taken out from bead mill 100. The slurry is taken out in the same manner as described above. Thus prepared is about 500 g of an amorphous slurry including 100 g of the zeolite and a total 400 g of $H_2O$.

The amorphous slurry that has just been taken out from bead mill 100 is in a gel state. Therefore, the gelled amorphous slurry is placed on a pot rack and rotated before a next step (hydrothermal synthesis step). With this operation, the gelation of the slurry is alleviated, so that the amorphous slurry exhibits flowability.

A driving period of bead mill 100, a flow rate of a slurry, and a viscosity of a slurry during each of the pulverization operations may be appropriately adjusted to make a pulverized Na zeolite have a desired average particle size.

[3. Hydrothermal Synthesis by Autoclave in Drying Machine]

Subsequently, the amorphous slurry prepared in S110 is subjected to hydrothermal synthesis for crystallization by autoclave 200 in a drying machine (S120). In the present disclosure, crystallization is also referred to as recrystallization.

Figure 4:
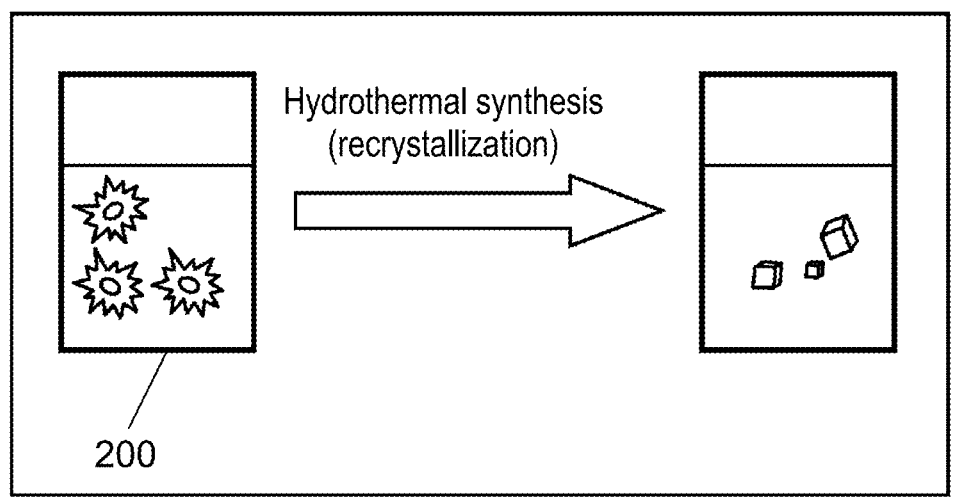
FIG. 4 is a schematic view for illustrating a hydrothermal synthesis step by an autoclave.

FIG. 4 is a schematic view for illustrating a hydrothermal synthesis step (recrystallization step) by an autoclave. Autoclave 200 is formed of a stainless steel container.

First, 50 g of the amorphous slurry that has been prepared in the previous step and exhibits flowability is charged into the stainless steel container (SUS316, volume 100 cc, temperature resistance 200° C., pressure resistance 50 MPa) that constitutes autoclave 200. The stainless steel container has a sealed structure of being sealed with a lid that includes a safety valve. A fluororesin container is included in the stainless steel container. The amorphous slurry is charged into the fluororesin container, and the stainless steel container is sealed. The sealed stainless steel container is disposed in the drying machine, the drying machine is closed, and a temperature inside the drying machine is set to 180° C. When heating is started, the temperature in the drying machine rises from a room temperature of 25° C. to reach 180° C. after about 15 minutes. The stainless steel container is left for 24 hours while the temperature in the drying machine is kept at 180° C. Thus, the hydrothermal synthesis is performed for the amorphous slurry. A temperature (temperature in the drying machine) and a period of the hydrothermal synthesis are not particularly limited as long as the hydrothermal synthesis is sufficiently performed for the amorphous slurry, however, it is favorable to perform the hydrothermal synthesis, for example, at a temperature ranging from about 150° C. to about 200° C. for about 15 hours to about 24 hours.

After the hydrothermal synthesis is completed, the slurry is taken out from autoclave 200. First, the stainless steel container is taken out from the drying machine having a temperature of 180° C., and the stainless steel container is put into water (ordinary temperature) for rapid cooling. After a temperature of the stainless steel container is confirmed to have been lowered to approximately room temperature, the safety valve is loosened to leak internal pressure, and the lid is removed. After water is added into the fluororesin container included in the stainless steel container, the slurry is taken out and put in another fluororesin container. With water added into the fluororesin container, a slurry near a bottom part of the fluororesin container can also be taken out.

[4. Drying]

Subsequently, the slurry that has undergone the hydrothermal synthesis in S120 is taken out and dried (S130). First, the fluororesin container containing the taken-out slurry is lidded with aluminum foil to prevent bumping and incorporation of dust. Then, the fluororesin container is placed in the drying machine and left at 180° C. for 2 hours to 3 hours. A drying temperature is not particularly limited for drying the slurry that has undergone the hydrothermal synthesis, however, the drying temperature favorably ranges, for example, from about 150° C. to about 200° C.

Then, the fluororesin container is taken out from the drying machine and left to room temperature so that a Na nano zeolite is obtained. A slurry dry powder is lumped in the fluororesin container, and therefore, the powder lump is cracked in a mortar, and the cracked powder is, for obtaining uniform particles, passed through a mesh to have an average particle size of 50 nm.

[5. Ion Exchange from Sodium to Magnesium]

Figure 5:
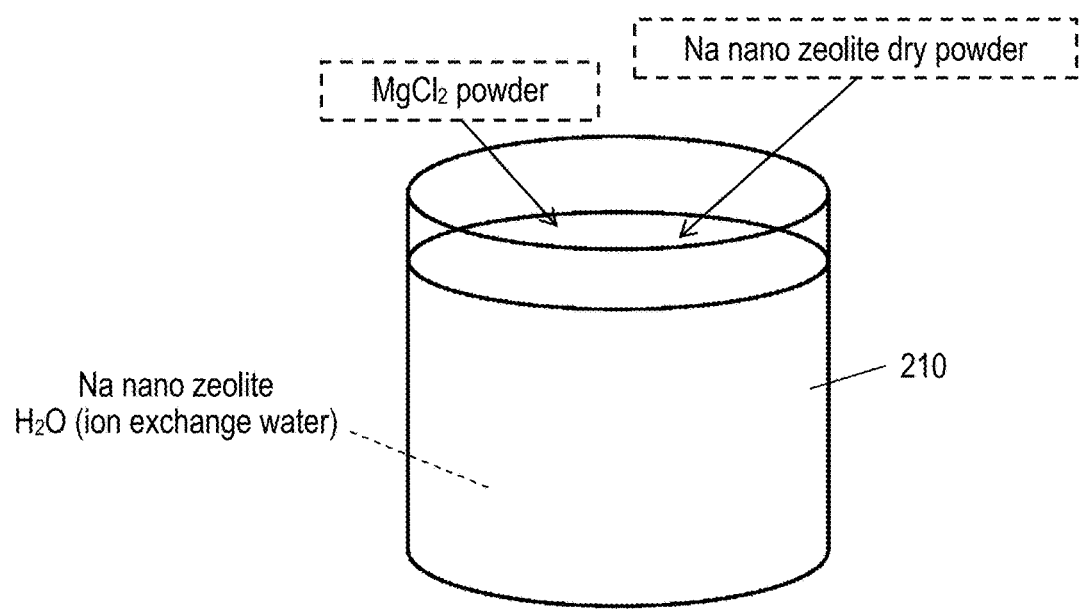
FIG. 5 is a schematic view for illustrating ion exchange from sodium to magnesium.

Subsequently, the Na nano zeolite obtained in S130 is subjected to ion exchange from sodium to magnesium (S140). FIG. 5 is a schematic view for illustrating ion exchange from sodium to magnesium.

As illustrated in FIG. 5, first, in glass container 210 are mixed 10 g of the Na nano zeolite dry powder obtained in S130, 30 g of magnesium chloride, and 400 g of $H_2O$. Then, glass container 210 is placed on a hot plate, and the mixture is agitated with a rotor for about a half day while being heated at about 60° C.

When the agitation is stopped, the nano zeolite is deposited at a bottom of glass container 210. Then, a supernatant solution in glass container 210 is discarded, and 200 g of $H_2O$ is charged into glass container 210 again. Glass container 210 is placed on the hot plate, and the mixture is agitated with a rotor for about 10 minutes to about 15 minutes while being heated at about 60° C. When the agitation is stopped, the nano zeolite is deposited at a bottom of glass container 210. Then, a supernatant solution in glass container 210 is discarded. This series of operations is repeated about 5 times. It is favorable to adjust a temperature of a reaction system during the ion exchange to about 40° C. to about 80° C. and a treatment period to about 6 hours to about 8 hours. Glass container 210 is transparent, so that how the nano zeolite is deposited can easily be observed from outside.

Sodium (alkali metal) included in the Na zeolite as an initially charged material is likely to cause ion migration, possibly causing a defect when the obtained Na nano zeolite is applied to an electronic component. It is favorable to apply to an electronic component a Mg nano zeolite obtained through the ion exchange to magnesium (alkali earth metal) that is less likely to cause ion migration than sodium does, as in the method for producing a nano zeolite according to the first exemplary embodiment, because no defect occurs.

[6. Drying]

Subsequently, after a series of ion exchange operations is repeated about 5 times in S140, the nano zeolite deposited at the bottom of glass container 210 is poured into a fluororesin container. At this time, the fluororesin container is lidded with aluminum foil to prevent bumping and incorporation of dust. Then, the fluororesin container is placed in the drying machine and left at 180° C. for 2 hours to 3 hours for drying (S150). After the drying is completed, the fluororesin container is taken out from the drying machine and left until the fluororesin container has room temperature. A slurry dry powder is lumped in the fluororesin container, and therefore, the powder lump is cracked in a mortar, and the cracked powder is, for obtaining uniform particles, passed through a mesh to have an average particle size of 50 nm. Thus, a Mg nano zeolite can be obtained. A drying temperature is not particularly limited for drying the slurry that has undergone the ion exchange, however, the drying temperature favorably ranges, for example, from about 150° C. to about 200° C.

Hereinafter, described are various measurement results of nano zeolites produced as described above.

Figure 6:
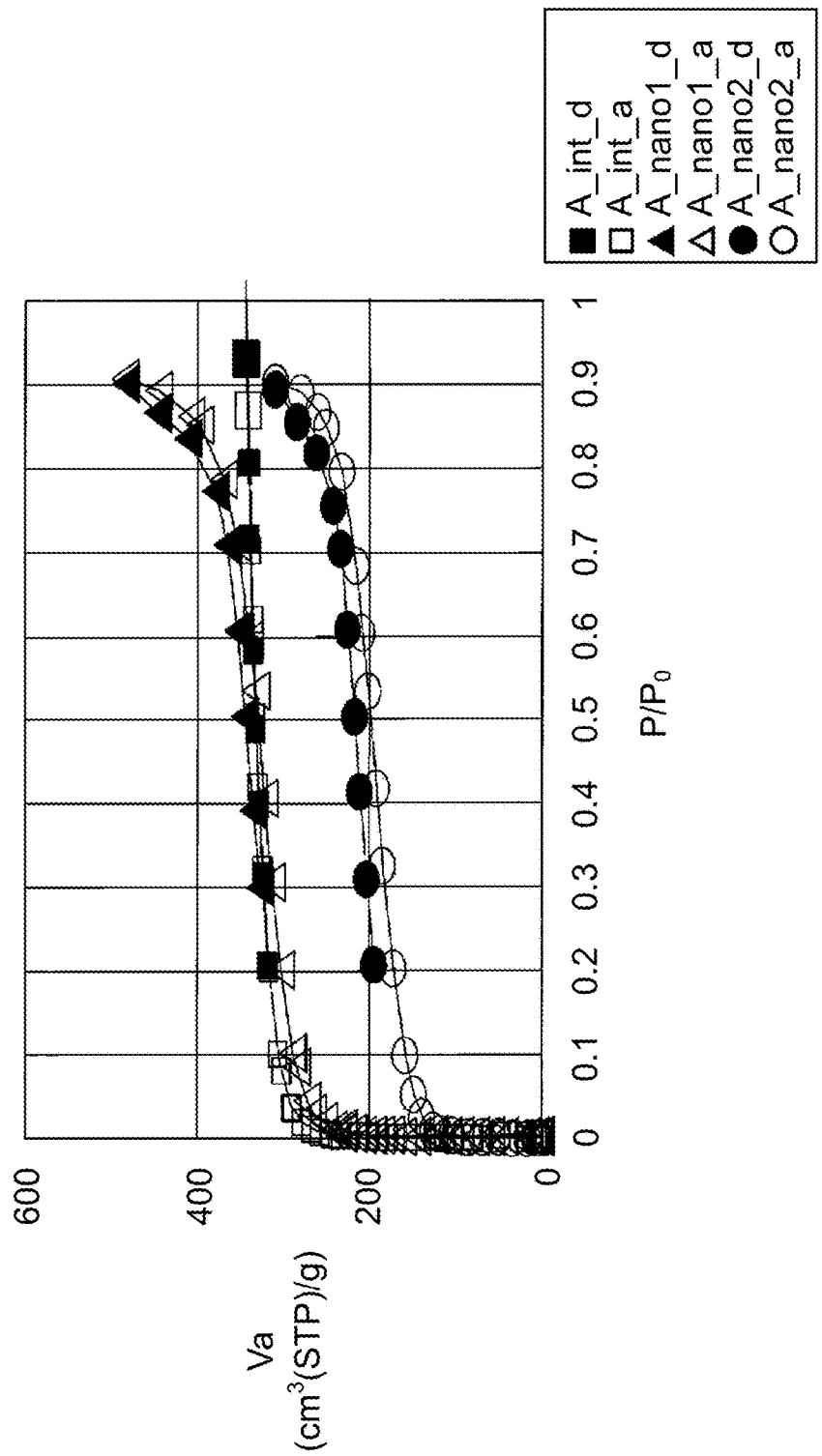
FIG. 6 is a graph for illustrating a difference in moisture absorption and desorption characteristics between a nano zeolite obtained through hydrothermal synthesis for crystallization and a nano zeolite obtained through a thermal treatment in atmosphere for crystallization.

FIG. 6 is a graph for illustrating a difference in moisture absorption and desorption characteristics at 25° C. between a nano zeolite obtained by physically pulverizing a zeolite and subjecting the physically pulverized zeolite to the hydrothermal synthesis for crystallization and a nano zeolite obtained by subjecting the physically pulverized zeolite to a thermal treatment in atmosphere for crystallization. A vertical axis, Va ($cm^3$ (STP)/g) in FIG. 6 is a moisture absorption amount per 1 g of a sample in terms of volume of gas in a standard state (0° C., 1 atm). That is, Va represents volume of water vapor adsorbed by 1 g of a zeolite in a standard state. A horizontal axis, $P/P_0$ in FIG. 6 represents relative pressure, with $P_0$ representing saturated steam pressure (kPa) at a measurement temperature (25° C.) and P representing absolute pressure (kPa).

In FIG. 6, (A_int_d) and (A_int_a) represent plots of measurement results of a zeolite A as an initially charged material. (A_nano1_d) and (A_nano1_a) represent plots of measurement results of a nano zeolite A prepared by physically pulverizing the zeolite A by the bead mill and then subjecting the physically pulverized zeolite A to the hydrothermal synthesis (180° C., 15 hours). (A_nano2_d) and (A_nano2_a) represent plots of measurement results of a nano zeolite A prepared by physically pulverizing the zeolite A by the bead mill and then subjecting the physically pulverized zeolite A to a thermal treatment in atmosphere (400° C.). (A_int_d), (A_nano1_d), and (A_nano2_d) represent plots of desorption characteristics, and (A_int_a), (A_nano1_a), and (A_nano2_a) represent plots of adsorption characteristics.

As illustrated in FIG. 6, the nano zeolite A that has undergone the thermal treatment in atmosphere is understood not to exhibit moisture absorption characteristics as much as the zeolite A as an initially charged material does. On the other hand, with the hydrothermal synthesis performed, it is understood that the nano zeolite A can be obtained that exhibits moisture absorption characteristics comparable to the moisture absorption characteristics of the zeolite A as an initially charged material.

Figure 7:
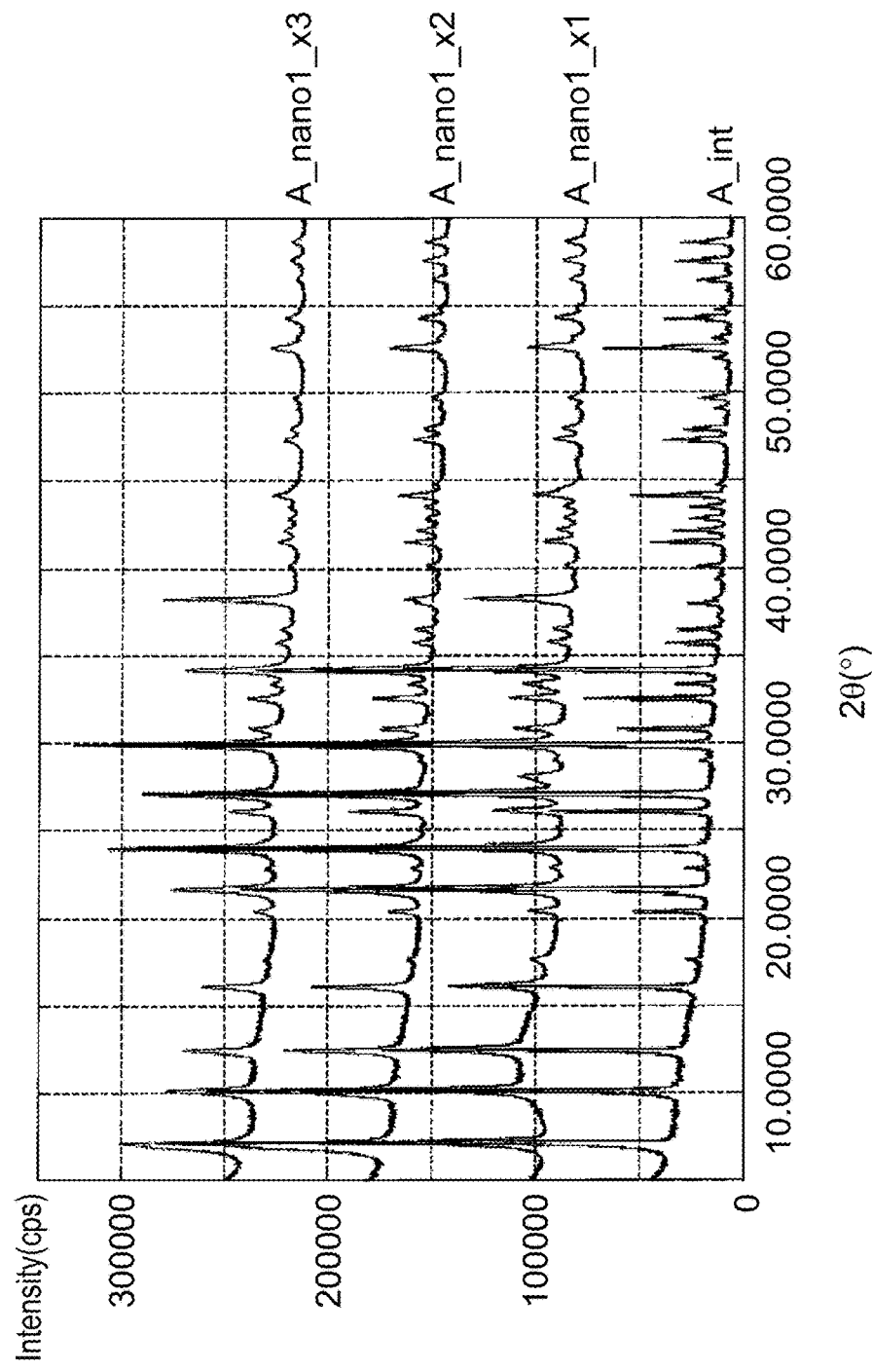
FIG. 7 is a graph for illustrating a hydrothermal synthesis period effective for recrystallization of a zeolite.

FIG. 7 is a graph for illustrating a hydrothermal synthesis period effective for recrystallization of a physically pulverized zeolite on the basis of results of X-ray diffraction (hereinafter, referred to as XRD) measurement. In FIG. 7, (A_int) represents an XRD measurement result of an initial zeolite. (A_nano1_x1) represents an XRD measurement result of a nano zeolite that has undergone the hydrothermal synthesis for 24 hours. (A_nano1_x2) represents an XRD measurement result of a nano zeolite that has undergone the hydrothermal synthesis for 36 hours. (A_nano1_x3) represents an XRD measurement result of a nano zeolite that has undergone the hydrothermal synthesis for 48 hours.

As illustrated in FIG. 7, a change in a crystal structure is understood to occur when the hydrothermal synthesis period is more than 48 hours. Therefore, the hydrothermal synthesis period is favorably less than 48 hours, and the hydrothermal synthesis is performed with the period set to a particularly favorable period ranging from 15 hours to 24 hours in the present disclosure.

Figure 8:
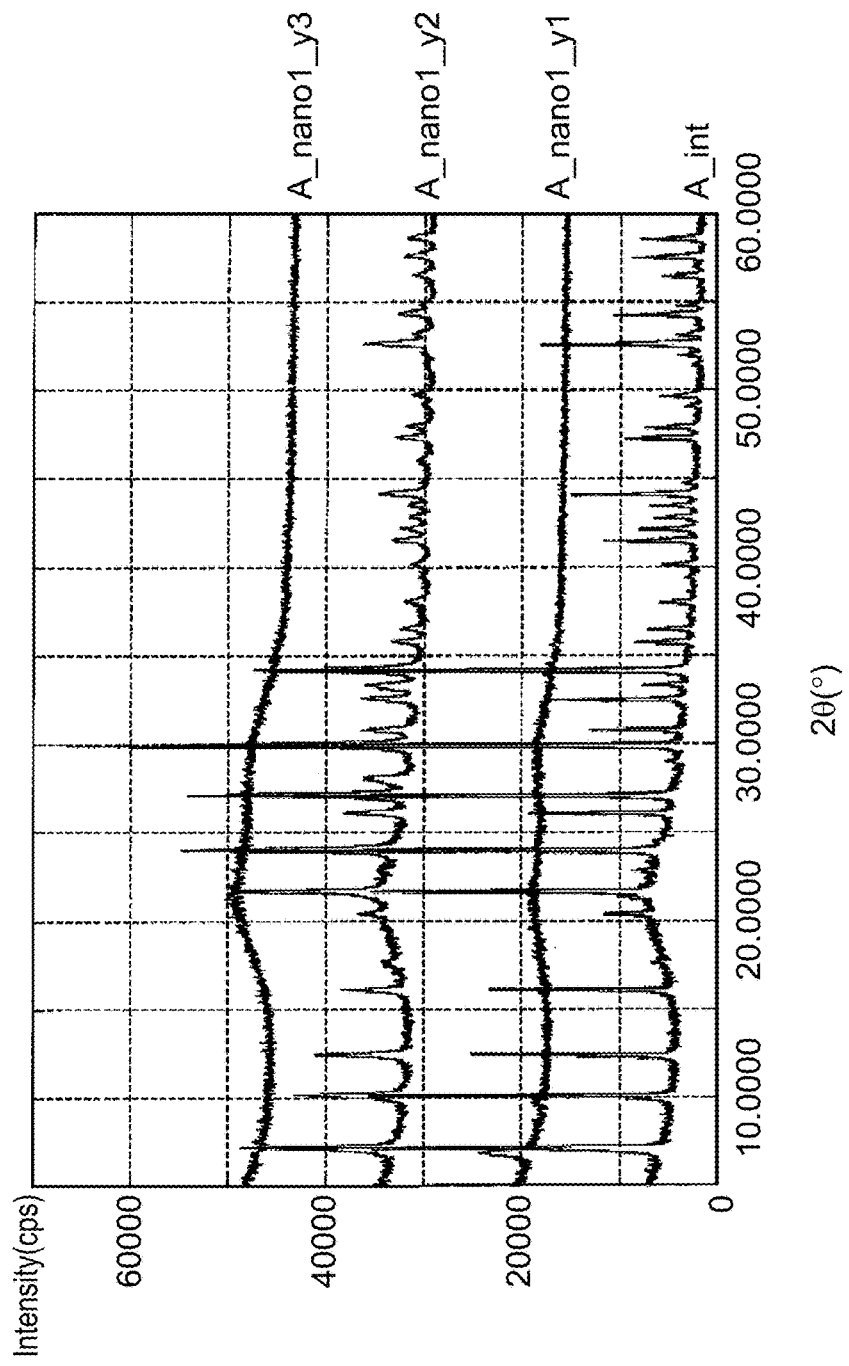
FIG. 8 is a graph for illustrating recrystallization of zeolites through hydrothermal synthesis.

FIG. 8 is a graph for illustrating recrystallization of a zeolite through the hydrothermal synthesis on the basis of XRD measurement results. In FIG. 8, (A_int) represents an XRD measurement result of an initial zeolite A. (A_nano1_y1) represents an XRD measurement result of the zeolite A that has just been physically pulverized by the bead mill. (A_nano1_y2) represents an XRD measurement result of a nano zeolite A that has been physically pulverized by the bead mill and has undergone the hydrothermal synthesis (180° C., 15 hours). (A_nano1_y3) represents an XRD measurement result of a nano zeolite A that has been physically pulverized by the bead mill and has undergone a thermal treatment in atmosphere (400° C.).

As shown by (A_int), crystallinity is recognized in the initial zeolite A. Directly after physically pulverized by the bead mill, however, the zeolite is understood to have lost the crystallinity as shown by (A_nano1_y1). It is understood that when a physically pulverized zeolite is subjected to the hydrothermal synthesis, the crystallinity is recognized again as shown by (A_nano1_y2). On the other hand, it is understood that when a physically pulverized zeolite is subjected to a thermal treatment in atmosphere, the crystallinity is left lost as shown by (A_nano1_y3). It is also understood that the crystallinity is left lost as in the XRD measurement result of (A_nano1_y3) when the zeolite A is physically pulverized by the bead mill and then (i) heated by a microwave oven, (ii) simply dried, or (iii) subjected to the hydrothermal synthesis under the conditions of 180° C. and a period of less than 8 hours.

Therefore, it is understood that the zeolite A that has been physically pulverized by the bead mill can be effectively recrystallized by subjecting the physically pulverized zeolite A to the hydrothermal synthesis (180° C., 15 hours).

Figure 9:
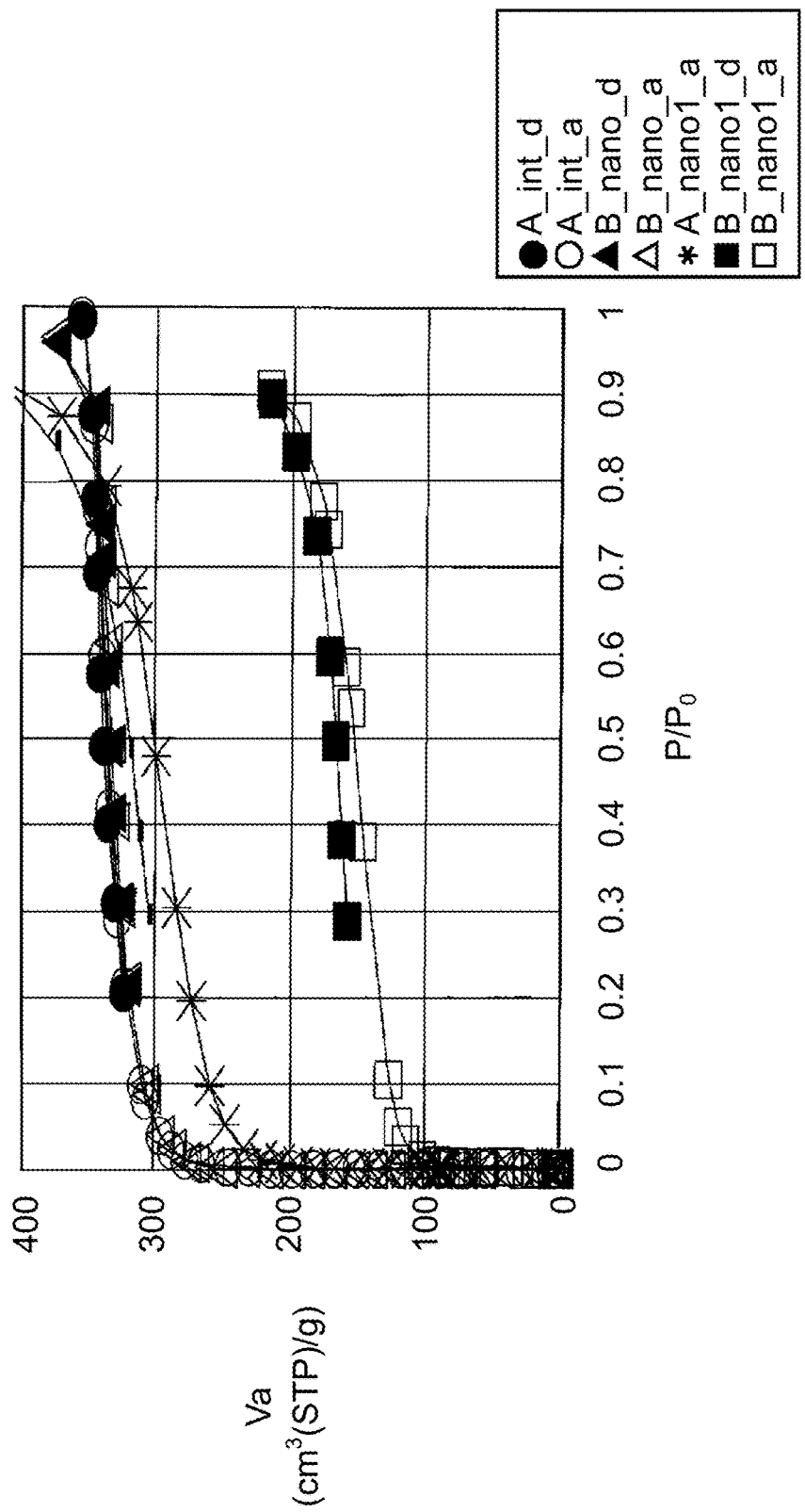
FIG. 9 is a graph for illustrating a difference in recrystallization of zeolites that is caused by a difference in composition of initial zeolites, on the basis of measurement results of moisture absorption and desorption characteristics.

FIG. 9 is a graph for illustrating a difference in recrystallization of zeolites that is caused by a difference in composition of initial zeolites, on the basis of measurement results of moisture absorption and desorption characteristics at 25° C. Specifically, the graph illustrates moisture absorption and desorption characteristics of a zeolite A and a zeolite B that both have the LTA structure but have different gradients of the Na/Si value from the surface in the depth direction, and moisture absorption and desorption characteristics of a nano zeolite A and a nano zeolite B that are prepared from the zeolite A and the zeolite B, respectively.

In FIG. 9, (A_int_d) and (A_int_a) represent plots of measurement results of the zeolite A as an initially charged material. (B_nano_d) and (B_nano_a) represent plots of measurement results of the zeolite B as an initially charged material. (A_nano1_d) represents a plot of a measurement result of the nano zeolite A prepared by physically pulverizing the zeolite A by the bead mill and then subjecting the physically pulverized zeolite A to the hydrothermal synthesis (180° C., 15 hours). (B_nano1_d) and (B_nano1_a) represent plots of measurement results of the nano zeolite B prepared by physically pulverizing the zeolite B by the bead mill and then subjecting the physically pulverized zeolite B to the hydrothermal synthesis (180° C., 15 hours). (A_int_d), (B_nano_d), and (B_nano1_d) represent plots of desorption characteristics, and (A_int_a), (B_nano_a), (A_nano1_a), and (B_nano1_a) represent plots of adsorption characteristics.

As illustrated in FIG. 9, the nano zeolite A exhibits moisture absorption characteristics comparable to the moisture absorption characteristics of the zeolite A as an initially charged material. On the other hand, the nano zeolite B is understood to be deteriorated in the moisture absorption characteristics as compared with the zeolite B as an initially charged material. Therefore, an important factor for obtaining a nano zeolite that exhibits effective moisture absorption characteristics is understood to be the gradient of the Na/Si value from the surface in the depth direction (relationship between the depth from the surface and the Na/Si value) of a zeolite as an initially charged material.

Figure 10:
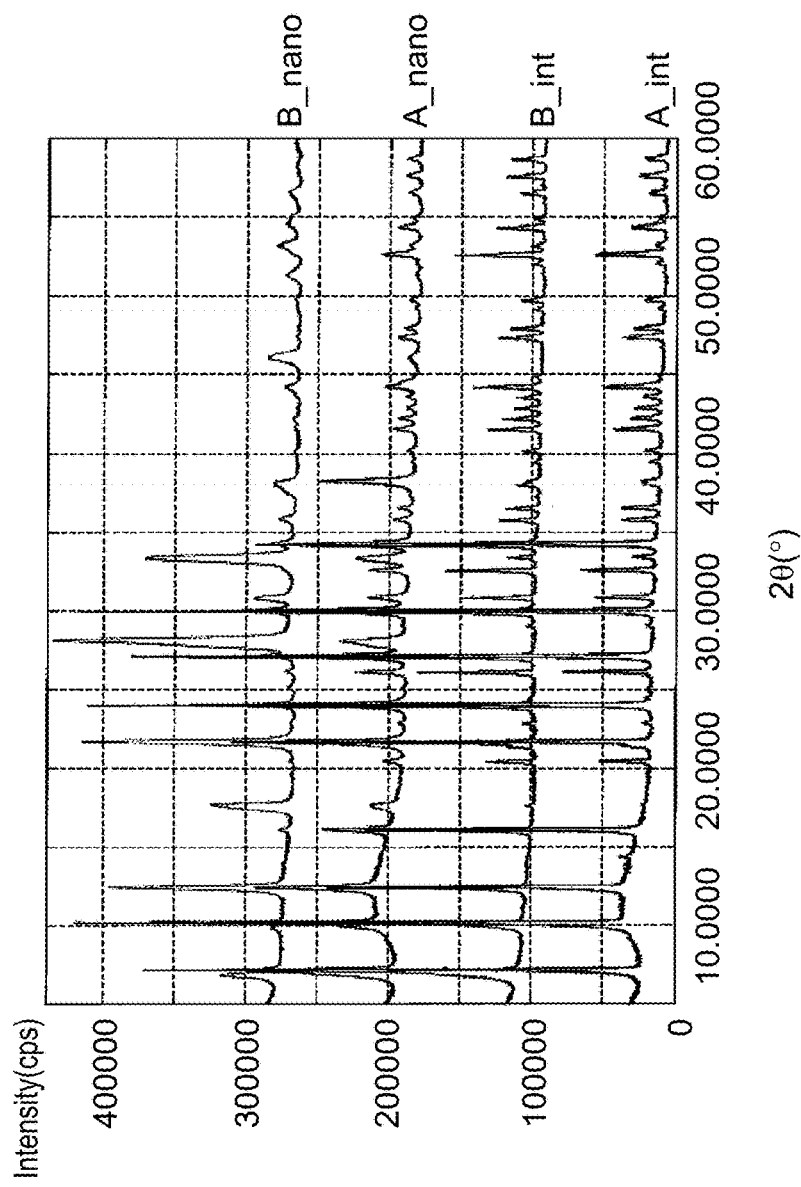
FIG. 10 is a graph for illustrating a difference in recrystallization of zeolites that is caused by a difference in composition of initial zeolites, on the basis of results of X-ray diffraction measurement.

FIG. 10 is a graph for illustrating a difference in recrystallization of zeolites that is caused by a difference in composition of initial zeolites, on the basis of XRD measurement results. Specifically, the graph illustrates XRD measurement results of a zeolite A and a zeolite B that both have the LTA structure but have different gradients of the Na/Si value from the surface in the depth direction, and XRD measurement results of a nano zeolite A and a nano zeolite B that are prepared from the zeolite A and the zeolite B, respectively.

In FIG. 10, (A_int) represents an XRD measurement result of the zeolite A as an initially charged material. (B_int) represents an XRD measurement result of the zeolite B as an initially charged material. (A_nano) represents an XRD measurement result of the nano zeolite A prepared by physically pulverizing the zeolite A by the bead mill and then subjecting the physically pulverized zeolite A to the hydrothermal synthesis (180° C., 15 hours). (B_nano) represents an XRD measurement result of the nano zeolite B prepared by physically pulverizing the zeolite B by the bead mill and then subjecting the physically pulverized zeolite B to the hydrothermal synthesis (180° C., 15 hours).

As illustrated in FIG. 10, the nano zeolite A exhibits a similar XRD measurement result to the XRD measurement result of the zeolite A as an initially charged material. On the other hand, the nano zeolite B is understood to give a different XRD measurement result from the XRD measurement result of the zeolite B as an initially charged material. Therefore, an important factor for obtaining a nano zeolite that is effectively recrystallized is understood to be the gradient of the Na/Si value from the surface in the depth direction (relationship between the depth from the surface and the Na/Si value) of a zeolite as an initially charged material.

Figure 11:
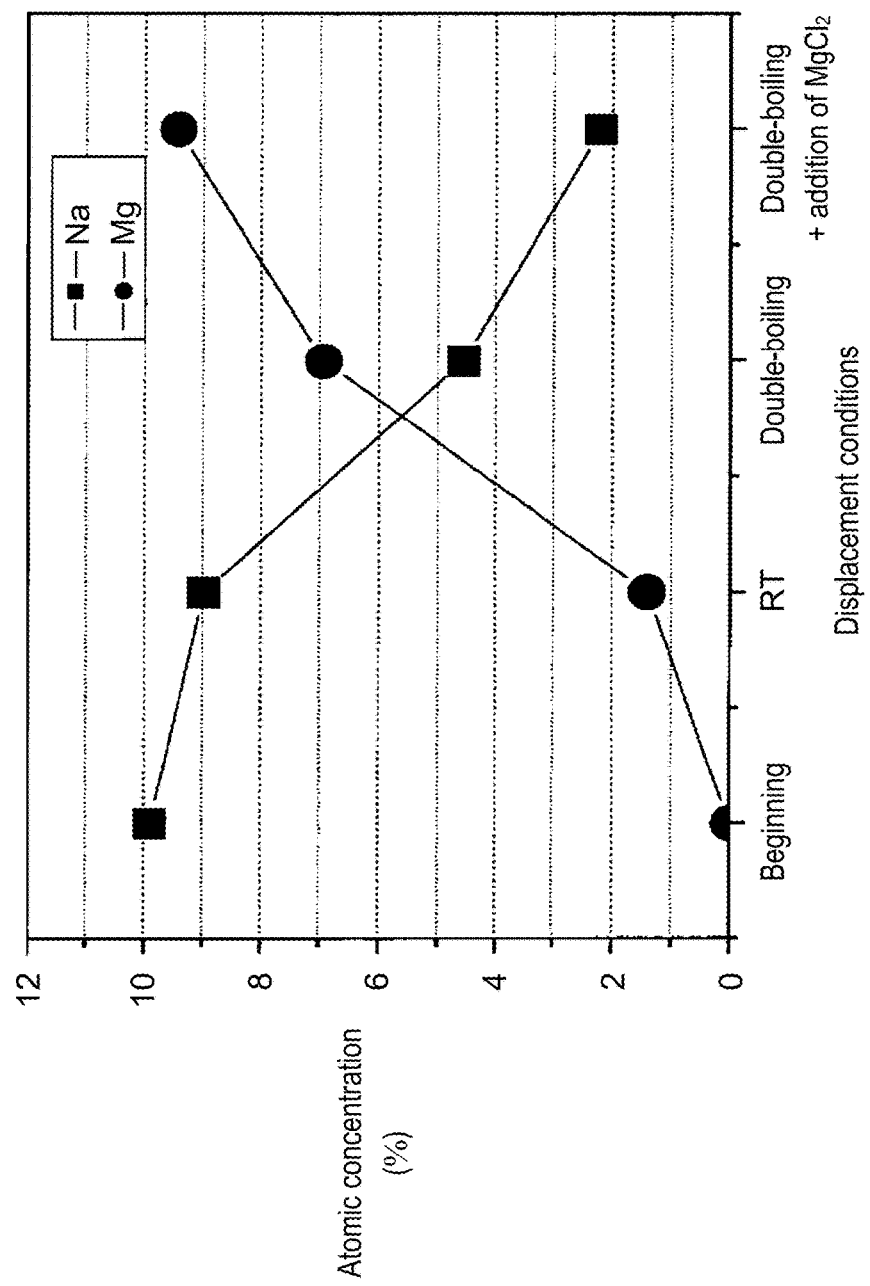
FIG. 11 is a graph for illustrating displacement conditions in ion exchange from sodium to magnesium.

FIG. 11 is a graph for illustrating displacement conditions in the ion exchange from sodium to magnesium. In FIG. 11, a vertical axis represents atomic concentration (%), and a horizontal axis represents displacement conditions. In FIG. 11, Na represents a plot of the atomic concentration of sodium in each displacement condition, and Mg represents a plot of the atomic concentration of magnesium in each displacement condition.

As illustrated in FIG. 11, the atomic concentration of sodium is 10% and the atomic concentration of magnesium is 0% in a nano zeolite A before the ion exchange ("beginning" of the displacement conditions). Next, the atomic concentration of sodium is 9% and the atomic concentration of magnesium is 1.5% when the nano zeolite A is charged into an aqueous magnesium chloride ($MgCl_2$) solution and the resulting mixture is agitated at room temperature for 2 hours ("RT" of the displacement conditions). Further, the atomic concentration of sodium is 4.5% and the atomic concentration of magnesium is 7% when the aqueous solution is heated to 60° C. to 70° C. and agitated for 2 hours ("double-boiling" of the displacement conditions). Furthermore, the atomic concentration of sodium is 2.2% and the atomic concentration of magnesium is 9.5% when magnesium chloride is further added during the double-boiling and the resulting mixture is agitated for 2 hours ("double-boiling"+addition of $MgCl_2$" of the displacement conditions). From the results described above, the atomic concentration of sodium in the nano zeolite can be further lowered when the aqueous magnesium chloride solution is double-boiled and magnesium chloride is further added. When such a nano zeolite is applied to an electronic component, a failure can be further reduced.

Figure 12A:
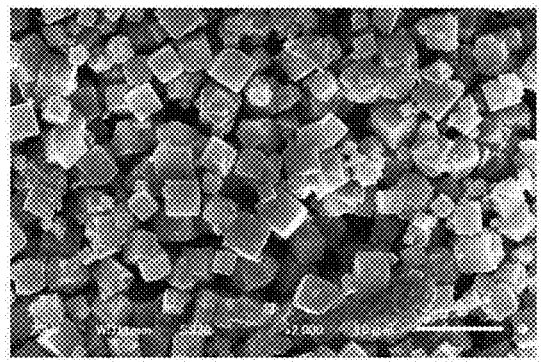
FIG. 12A is a scanning electron microscope photograph showing a particle structure of a sodium zeolite as an initially charged material.
Figure 12B:
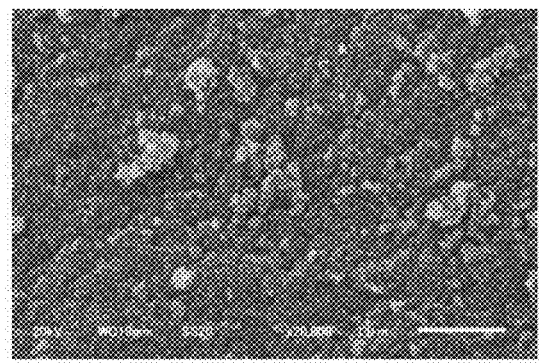
FIG. 12B is a scanning electron microscope photograph showing a particle structure of a physically pulverized sodium zeolite.
Figure 12C:
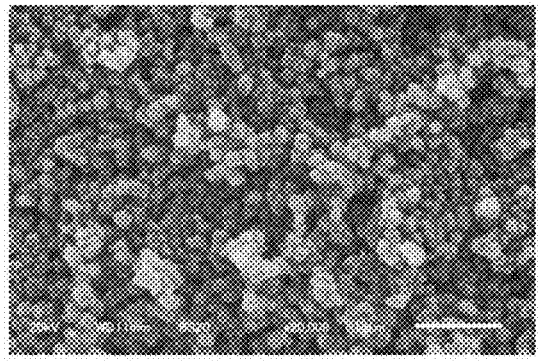
FIG. 12C is a scanning electron microscope photograph showing a particle structure of a product obtained by physically pulverizing a sodium zeolite and then subjecting the physically pulverized sodium zeolite to hydrothermal synthesis.

FIG. 12 is scanning electron microscope (hereinafter, referred to as SEM) photographs of a nano zeolite in production processes, with a Na zeolite as an initially charged material. FIG. 12A is a SEM photograph of the Na zeolite as an initially charged material. FIG. 12B is a SEM photograph of the Na zeolite that has been physically pulverized by the bead mill. FIG. 12C is a SEM photograph of a product obtained by subjecting the Na zeolite physically pulverized by the bead mill to the hydrothermal synthesis (180° C., 15 hours).

As illustrated in FIG. 12A, the Na zeolite as an initially charged material is understood to have a crystal structure. As illustrated in FIG. 12B, however, it is understood that the physical pulverization makes the Na zeolite nanosized but the crystal structure of the Na zeolite is lost. Then, as illustrated in FIG. 12C, it is understood that the hydrothermal synthesis recrystallizes the nanosized Na zeolite to prepare a Na nano zeolite having a similar crystal structure to the crystal structure of the initially charged material.

Figure 13A:
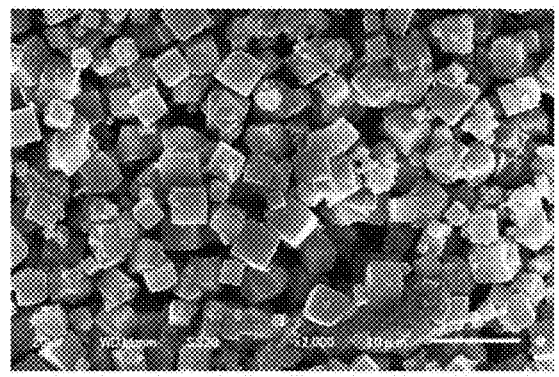
FIG. 13A is a scanning electron microscope photograph showing a particle structure of a calcium zeolite as an initially charged material.
Figure 13B:
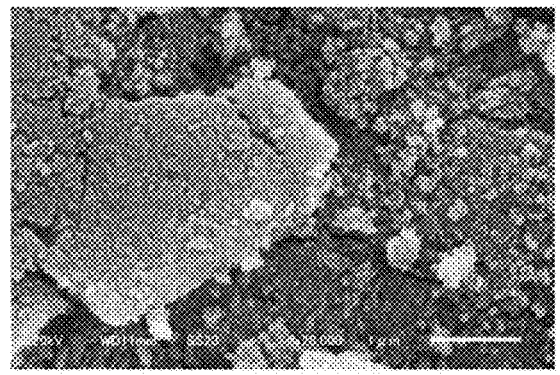
FIG. 13B is a scanning electron microscope photograph showing a particle structure of a physically pulverized calcium zeolite.
Figure 13C:
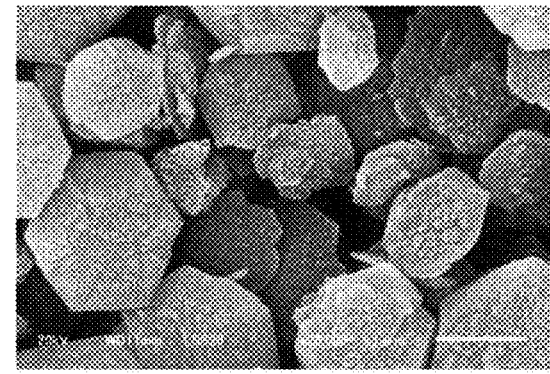
FIG. 13C is a scanning electron microscope photograph showing a particle structure of a product obtained by physically pulverizing a calcium zeolite and then subjecting the physically pulverized calcium zeolite to hydrothermal synthesis.

FIGS. 13A to 13C are SEM photographs of a nano zeolite in production processes, with a calcium zeolite (hereinafter, referred to as a Ca zeolite) as an initially charged material, as an example of an alkali earth metal zeolite in place of a magnesium zeolite. FIG. 13A is a SEM photograph of the Ca zeolite as an initially charged material. FIG. 13B is a SEM photograph of the Ca zeolite that has been physically pulverized by the bead mill. FIG. 13C is a SEM photograph of a product obtained by subjecting the Ca zeolite physically pulverized by the bead mill to the hydrothermal synthesis (180° C., 15 hours).

As illustrated in FIG. 13A, the Ca zeolite as an initially charged material is understood to have a crystal structure. As illustrated in FIG. 13B, however, it is understood that the physical pulverization makes the Ca zeolite nanosized but the crystal structure of the Ca zeolite is lost. As illustrated in FIG. 13C, it is understood that the hydrothermal synthesis recrystallizes the Ca zeolite to prepare a product which has, however, a different crystal structure from the crystal structure of the initially charged material.

The SEM photographs of the Ca zeolite have been shown here, however, the magnesium zeolite that is similarly an alkali earth metal zeolite also gives a similar result.

From this result, it is understood that even when an alkali earth metal zeolite is used as an initially charged material, a nano zeolite that has desired moisture absorption characteristics cannot be obtained. A Na zeolite can be effectively crystallized through the hydrothermal synthesis after the gelation. On the other hand, the alkali earth metal zeolite does not turn into a gel state, and even when subjected to the hydrothermal synthesis for crystallization, the zeolite turns into a crystal that has, as illustrated in FIG. 13C, another structure and different characteristics from the characteristics of the initially charged material. Therefore, it is understood to be favorable to use, as an initially charged material, a Na zeolite not an alkali earth metal zeolite, and to perform the ion exchange from sodium to magnesium as illustrated in FIG. 11 when the prepared Na nano zeolite is applied to an electronic component.

Figure 14:
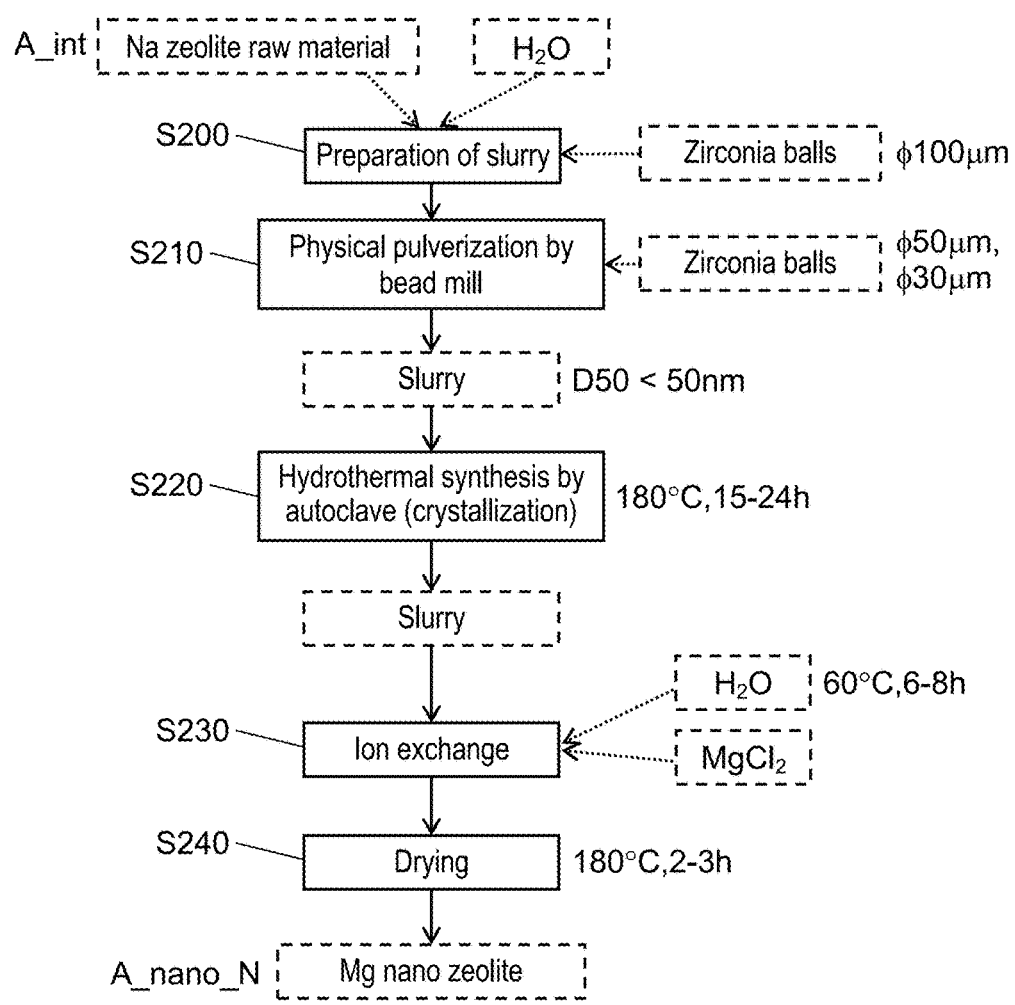
FIG. 14 is a flow chart that illustrates a method for producing a nano zeolite that does not include a drying step after a hydrothermal synthesis step.

FIG. 14 is a flow chart that illustrates a method for producing a nano zeolite that does not include a drying step after the hydrothermal synthesis step. The steps S200 to S220 in FIG. 14 correspond to the steps S100 to S120 in FIG. 1, respectively. The steps S230 to S240 in FIG. 14 correspond to the steps S140 to S150 in FIG. 1, respectively. That is, the flow chart of FIG. 14 has no drying step (S130) that exists after the hydrothermal synthesis step in the flow chart of FIG. 1. The inventors of the present disclosure have found that the presence or absence of the drying step after the hydrothermal synthesis step affects the recrystallization of a zeolite. This is described in detail below.

Figure 15:
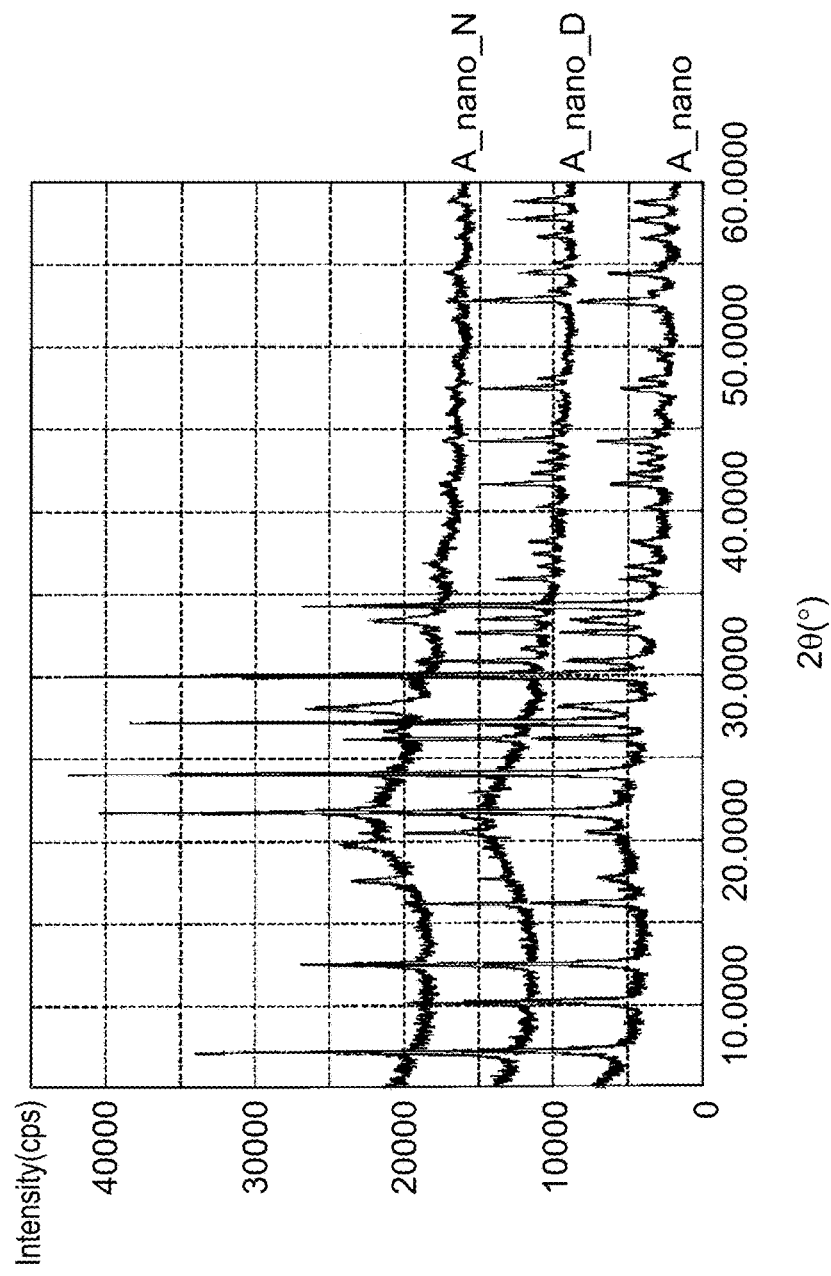
FIG. 15 is a graph for illustrating a difference in recrystallization of zeolites according to presence or absence of a drying step after a hydrothermal synthesis step, on the basis of results of X-ray diffraction measurement.

FIG. 15 is a graph for illustrating a difference in the recrystallization of zeolites according to the presence or absence of the drying step after the hydrothermal synthesis step, on the basis of XRD measurement results. In FIG. 15, (A_nano) represents an XRD measurement result of a nano zeolite A prepared by physically pulverizing a zeolite A by the bead mill and then subjecting the physically pulverized zeolite A to the hydrothermal synthesis (180° C., 15 hours). (A_nano_D) represents an XRD measurement result of a nano zeolite A prepared by performing the drying after the hydrothermal synthesis (180° C., 15 hours) as in the flow chart of FIG. 1 and further performing the ion exchange. (A_nano_N) represents an XRD measurement result of a nano zeolite A prepared by performing the ion exchange, without the drying after the hydrothermal synthesis (180° C., 15 hours) as in the flow chart of FIG. 14.

As shown by (A_nano_D), the nano zeolite A that has undergone the drying after the hydrothermal synthesis gives an XRD measurement result comparable to the result illustrated by (A_nano). On the other hand, as shown by (A_nano_N), the nano zeolite A that has not undergone the drying after the hydrothermal synthesis gives a different XRD measurement result from the results illustrated by (A_nano) and (A_nano_D). Specifically, in the XRD measurement result illustrated by (A_nano_N), part of peaks that have been recognized in the XRD measurement results illustrated by (A_nano) and (A_nano_D) are lost. The loss of the peaks means deterioration in the moisture absorption characteristics. Therefore, it is understood that a nano zeolite that is more excellent in the moisture absorption characteristics can be prepared when the drying step is provided after the hydrothermal synthesis step than when the drying step is not provided after the hydrothermal synthesis step.

Figure 16:
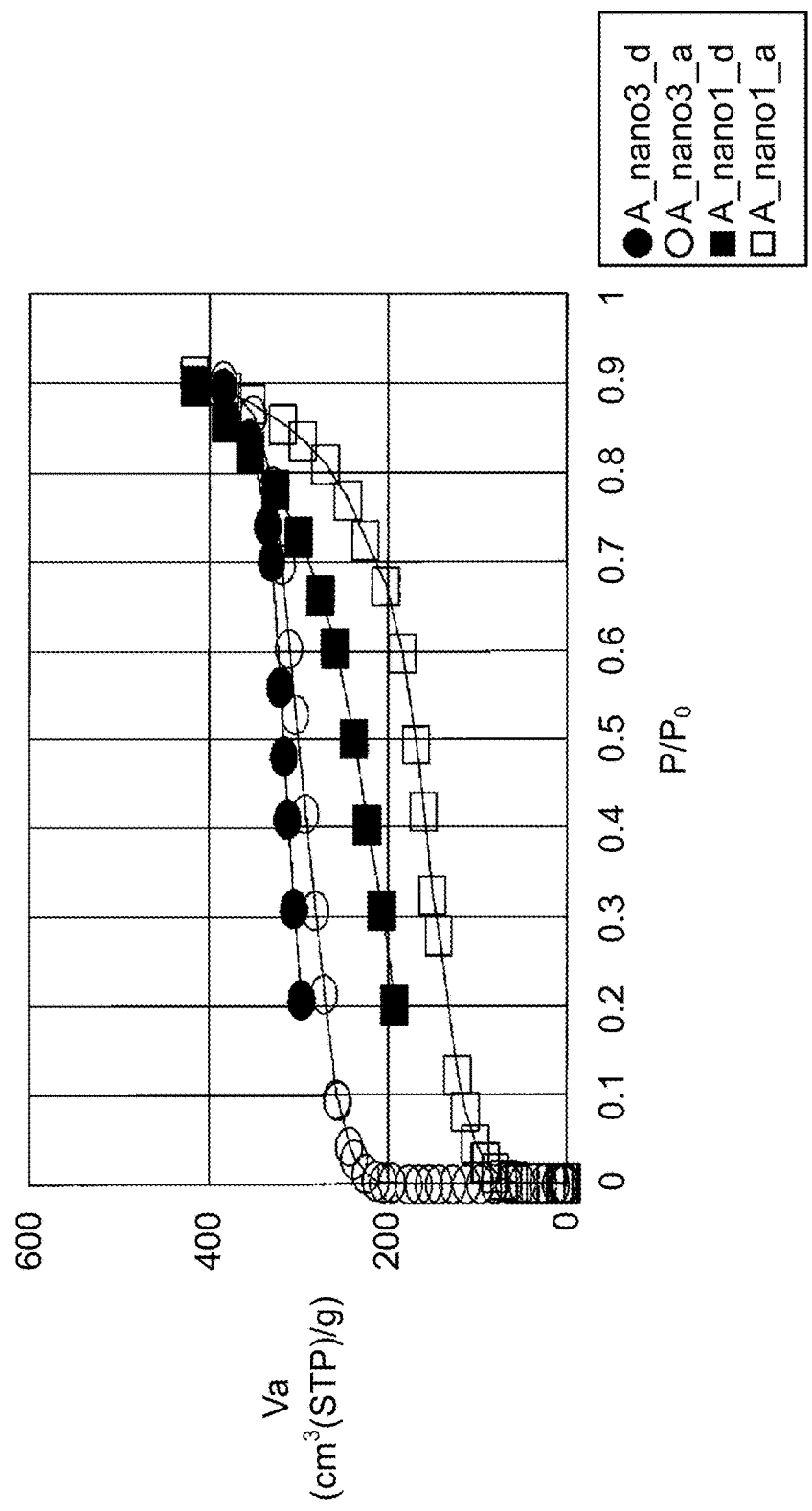
FIG. 16 is a graph for illustrating a difference in recrystallization of zeolites according to presence or absence of a drying step after a hydrothermal synthesis step, on the basis of measurement results of moisture absorption and desorption characteristics.

FIG. 16 is a graph for illustrating a difference in the recrystallization of a zeolite according to the presence or absence of the drying step after the hydrothermal synthesis step, on the basis of measurement results of moisture absorption and desorption characteristics at 25° C. In FIG. 16, (A_nano3_d) and (A_nano3_a) represent plots of measurement results of a nano zeolite prepared by performing the drying after the hydrothermal synthesis (180° C., 15 hours) as in the flow chart of FIG. 1. (A_nano1_d) and (A_nano1_a) represent plots of measurement results of a nano zeolite prepared without the drying after the hydrothermal synthesis (180° C., 15 hours) as in the flow chart of FIG. 14. (A_nano3_d) and (A_nano1_d) represent plots of desorption characteristics, and (A_nano3_a) and (A_nano1_a) represent plots of adsorption characteristics.

It is understood as illustrated in FIG. 16 that a nano zeolite that is more excellent in the moisture absorption characteristics can be prepared when the drying step is provided after the hydrothermal synthesis step than when the drying step is not provided after the hydrothermal synthesis step.

As described above, a nano zeolite can be obtained that exhibits desired and more excellent moisture absorption characteristics when the drying is performed after the hydrothermal synthesis and then the ion exchange from sodium to magnesium is performed than when the ion exchange is performed directly after the hydrothermal synthesis.

Figure 17:
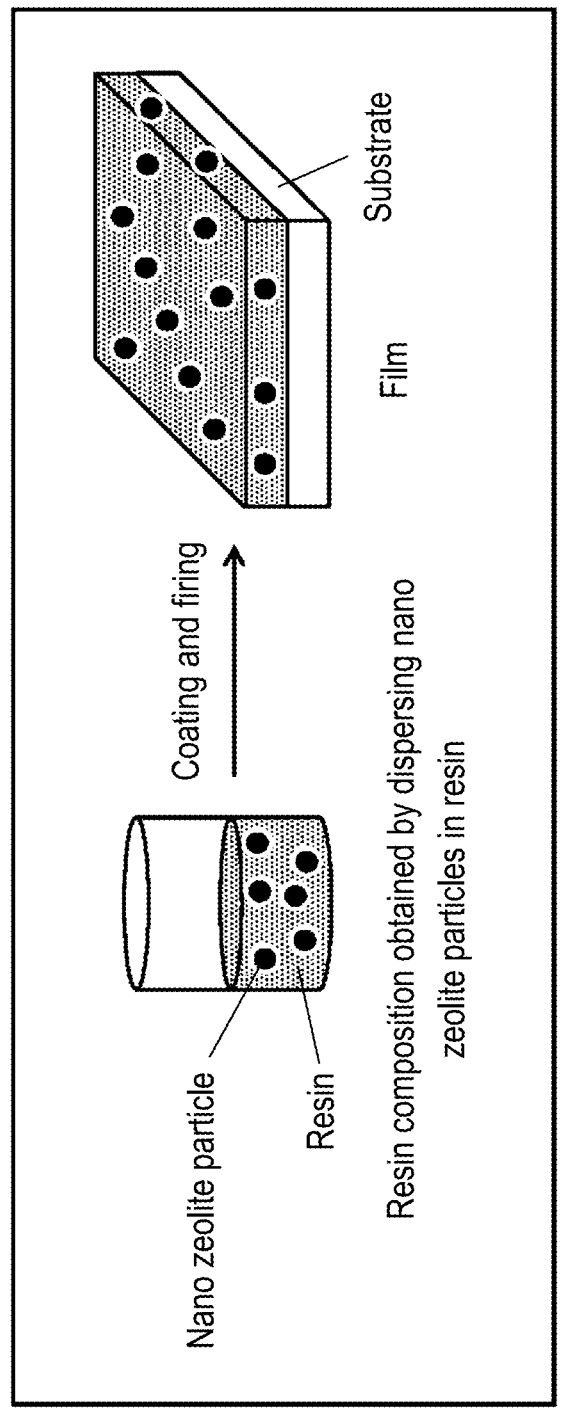
FIG. 17 is a diagram for illustrating an example of application of a nano zeolite as a film.

FIG. 17 is a diagram for illustrating an example of application of a nano zeolite as a film. A zeolite in bulk takes on a white color due to light scattering, while light transmission can be improved by making the zeolite nanosized to be dispersed. FIG. 17 shows an application example of coating a substrate with a resin composition obtained by dispersing nano zeolite particles in a resin and firing the composition-coated substrate to give a film. With such application, a nano zeolite produced by the production method of the present disclosure can be utilized as a barrier thin film of an electronic component, such as an organic light-emitting diode, that requires moisture resistance and water resistance.

Other Exemplary Embodiments

As described above, the first exemplary embodiment has been described to exemplify a technique of the present disclosure. For the description, the accompanying drawings and the detailed description have been provided.

Therefore, constitutional elements described in the accompanying drawings and the detailed description include not only essential constitutional elements but also inessential constitutional elements for exemplifying the technique. For this reason, the inessential constitutional elements should not immediately be determined to be essential because these inessential elements are described in the accompanying drawings or the detailed description.

Further, the first exemplary embodiment is for exemplifying the technique of the present disclosure, and the present disclosure is not limited to the first exemplary embodiment but is also applicable to an exemplary embodiment including, for example, various changes, replacement, addition and/or omission within a scope of claims or a range equivalent to the scope. It is also possible to arrange a new exemplary embodiment by combining constitutional elements described in the first exemplary embodiment.

A nano zeolite produced by the production method of the present disclosure is applicable to various fields such as an electronic field including a barrier thin film of an electronic component, a packing field, a clothing field, and a medical field.

What is claimed is:

1. A method for producing a zeolite, the method comprising:
   physically pulverizing a Na zeolite that has a gradient of a Na/Si value from a surface of the Na zeolite in a depth direction, that has a proportion of the Na/Si value at a depth of 10 nm from the surface to the Na/Si value at the surface of 90% or more, and that has a proportion of the Na/Si value at a depth of 30 nm from the surface to the Na/Si value at the surface of 70% or more, the Na/Si value representing a composition ratio between Na and Si; and
   performing crystallization of the Na zeolite that was physically pulverized.

2. The method for producing a zeolite according to claim 1,
   wherein the crystallization is performed by hydrothermal synthesis.

3. The method for producing a zeolite according to claim 1,
   wherein the Na/Si value at a depth of 10 nm is larger than the Na/Si value at a depth of 30 nm.

4. The method for producing a zeolite according to claim 3,
   wherein the crystallization is performed by hydrothermal synthesis.

* * * * *